(12) United States Patent  (10) Patent No.: US 7,962,857 B2
Plestid et al.  (45) Date of Patent: Jun. 14, 2011

(54) AUTOMATIC LANGUAGE SELECTION FOR IMPROVING TEXT ACCURACY

(75) Inventors: Trevor Plestid, Ottawa (CA); Dimitrios Prodanos, Ottawa (CA)

(73) Assignee: Research In Motion Limited, Waterloo, Ontario (CA)

( * ) Notice: Subject to any disclaimer, the term of this patent is extended or adjusted under 35 U.S.C. 154(b) by 971 days.

(21) Appl. No.: 11/251,147

(22) Filed: Oct. 14, 2005

(65) Prior Publication Data

US 2007/0085835 A1  Apr. 19, 2007

(51) Int. Cl.
  *G06F 3/048* (2006.01)
(52) U.S. Cl. .......................... 715/780; 345/171; 704/277
(58) Field of Classification Search .................. 345/171; 715/780
  See application file for complete search history.

(56) References Cited

U.S. PATENT DOCUMENTS

| | | | |
|---|---|---|---|
| 5,535,120 A * | 7/1996 | Chong et al. | 704/3 |
| 6,452,588 B2 | 9/2002 | Griffin et al. | |
| 7,224,989 B2 * | 5/2007 | Kraft | 455/466 |
| 7,385,531 B2 * | 6/2008 | Zhang | 341/28 |
| 2003/0073451 A1 * | 4/2003 | Kraft | 455/466 |
| 2004/0138869 A1 * | 7/2004 | Heinecke | 704/1 |
| 2005/0108017 A1 | 5/2005 | Esser et al. | |
| 2005/0198023 A1 * | 9/2005 | James et al. | 707/4 |
| 2006/0119583 A1 * | 6/2006 | Potera | 345/171 |

FOREIGN PATENT DOCUMENTS

| | | |
|---|---|---|
| EP | 0 725 353 A | 8/1996 |
| EP | 1 225 184 A | 11/2002 |
| EP | 1 480 420 A | 11/2004 |
| EP | 1 480 421 A | 11/2004 |
| JP | 07 085060 A | 3/1995 |

OTHER PUBLICATIONS

"Mechanism to Auatomate National Language Configuration", IBM Technical Disclosure Bulletin, IBM Corp., New York, US, vol. 36, No. 9B, Sep. 1, 1993, pp. 113-114, XP000397090.

* cited by examiner

*Primary Examiner* — Tadeese Hailu
*Assistant Examiner* — Darrin Hope
(74) *Attorney, Agent, or Firm* — Finnegan, Henderson, Farabow, Garret & Dunner LLP (57) ABSTRACT

A method, and a handheld electronic device that implements the method, for selecting a number of languages used by a text disambiguation function executed by an electronic device during a text entry session. The method comprises determining a context for the text entry session, and responsive to the determining, selecting at least some of the number of languages used by the text disambiguation function during the text entry session.

7 Claims, 8 Drawing Sheets

AUTOMATIC LANGUAGE SELECTION FOR IMPROVING TEXT ACCURACY

BACKGROUND

1. Field of the Invention

The invention relates generally to handheld electronic devices and, more particularly, to a handheld electronic device executing an application which employs a keystroke interpretation system. The invention further relates to methods of automatically selecting the language that the keystroke interpretation system utilizes.

2. Background Information

Numerous types of handheld electronic devices are known. Examples of such handheld electronic devices include, for instance, personal data assistants (PDAs), handheld computers, two-way pagers, cellular telephones, and the like. Many handheld electronic devices also feature wireless communication capability, although many such handheld electronic devices are stand-alone devices that are functional without communication with other devices.

Such handheld electronic devices are generally intended to be portable, and thus are of a relatively compact configuration in which keys and other input structures often perform multiple functions under certain circumstances or may otherwise have multiple aspects or features assigned thereto. With advances in technology, handheld electronic devices are built to have progressively smaller form factors yet have progressively greater numbers of applications and features resident thereon. As a practical matter, the keys of a keypad can only be reduced to a certain small size before the keys become increasingly unusable. In order to enable text entry, however, a keypad must be capable of entering all twenty-six letters of the Latin alphabet, for instance, as well as appropriate punctuation and other symbols.

One way of providing numerous letters in a small space has been to provide a "reduced keyboard" in which multiple letters, symbols, digits, and the like, are assigned to any given key. For example, a touch-tone telephone includes a reduced keyboard by providing twelve keys, of which ten have digits thereon, and of these ten keys, eight have Latin letters and symbols assigned thereto. For instance, one of the keys includes the digit "2" as well as the letters "A", "B", and "C". Since a single actuation of such a key potentially could be intended by the user to refer to any of the letters "A", "B", and "C", and potentially could also be intended to refer to the digit "2", the input (by actuation of the key) generally is an ambiguous input and is in need of some type of disambiguation in order to be useful for text entry purposes. Other known reduced keyboards have included other arrangements of keys, letters, symbols, digits, and the like.

In order to enable a user to make use of the multiple letters, digits, and the like on any given key in an ambiguous keyboard, numerous keystroke interpretation systems have been provided. For instance, a "multi-tap" system allows a user to substantially unambiguously specify a particular character on a key by pressing the same key a number of times equivalent to the position of the desired character on the key. For example, on the aforementioned telephone key that includes the letters "ABC", if the user desires to specify the letter "C", the user will press the key three times.

Another exemplary keystroke interpretation system would include key chording, of which various types exist. For instance, a particular character can be entered by pressing two keys in succession or by pressing and holding a first key while pressing a second key. Still another exemplary keystroke interpretation system would be a "press-and-hold/press-and-release" interpretation function in which a given key provides a first result if the key is pressed and immediately released, and provides a second result if the key is pressed and held for a short period of time.

Another keystroke interpretation system that has been employed is a software-based text disambiguation function. In such a system, a user typically presses keys to which one or more characters have been assigned, generally pressing each key one time for each desired letter, and the disambiguation software attempts to determine the intended input. Numerous such systems have been proposed. One example of such a system is disclosed in commonly owned U.S. patent application Ser. No. 10/931,281, entitled "Handheld Electronic Device With Text Disambiguation," the disclosure of which is incorporated herein by reference.

As will be appreciated, certain of the keystroke interpretation systems described above ("multi-tap," chording, and "press-and-hold/press-and-release") rely on the number of times that a key is actuated, the number of keys that are actuated, and/or how long that a key remains actuated, each of which constitute a non-ambiguous key actuation sequence, to ascertain, with certainty, the intended input. Such systems do not attempt to determine an intended input using an ambiguous input like software-based text disambiguation function systems do. Such keystroke interpretation systems ("multi-tap," chording, and "press-and-hold/press-and-release") shall be referred to herein as "determinative keystroke interpretation systems."

Handheld electronic devices that incorporate a probabilistic keystroke interpretation system such as a software-based text disambiguation function system may encounter additional difficulty during text entry in different languages. In an email application, for example, a user may send a first message to all French speaking recipients in French and a subsequent message to all German speaking recipients in German. The system may operate in an undesirable fashion because it does not know whether a given ambiguous input is intended to represent a French word or a German word.

Thus, a need exists for a handheld electronic device which employs a keystroke interpretation system and which facilitates text entry in multiple languages.

SUMMARY

One aspect of the disclosure relates to a method for selecting a number of languages used by a text disambiguation function executed by an electronic device during a text entry session. The method comprises determining a context for the text entry session, and responsive to the determining, selecting at least some of the number of languages used by the text disambiguation function during the text entry session.

Another aspect of the disclosure relates to a method of choosing a language to be used by a text disambiguation function executed by a handheld electronic device, the handheld electronic device being operable to send and receive messages from one or more recipients. The method comprises determining that a message being drafted is an original message and selecting a language in response to one or more language tags associated with at least some of the one or more recipients.

Another aspect of the disclosure relates to a method of choosing a language to be used by a text disambiguation function executed by a handheld electronic device, the handheld electronic device being operable to send and receive messages from one or more recipients. The method comprises determining that a message being drafted is a derived message and selecting the language of an original message from which the derived message depends.

Another aspect of the disclosure relates to a handheld electronic device which comprises a reduced keyboard having a plurality of keys, a processor, and a memory storing a plurality of routines executable by the processor, wherein a first one or more of the routines implements a keystroke interpretation system having a text disambiguation function, and wherein a second one or more of the routines is adapted to determine a context for a text entry session and responsive to the context, select at least some of the number of languages used by the text disambiguation function during the text entry session.

BRIEF DESCRIPTION OF THE DRAWINGS

A full understanding of the invention can be gained from the following Description of the Preferred Embodiments when read in conjunction with the accompanying drawings in which.

Similar numerals refer to similar parts throughout the specification.

DESCRIPTION OF THE PREFERRED EMBODIMENTS

Figure 1:
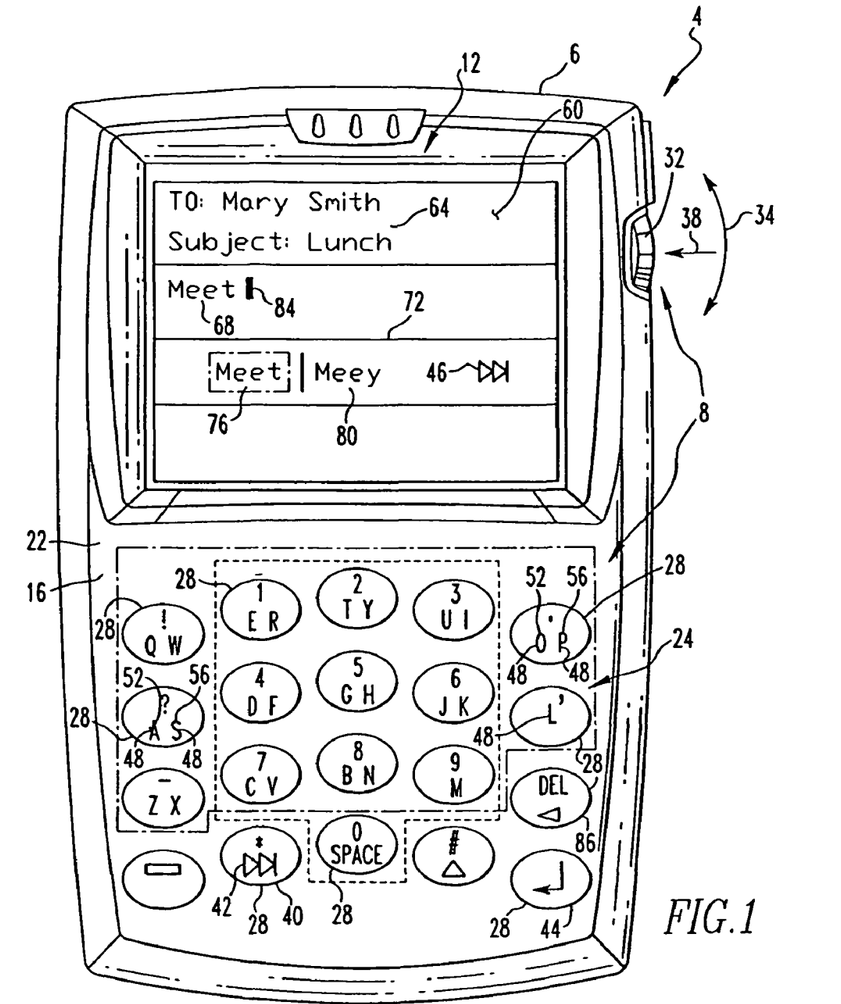
FIG. 1 is a front view of an improved handheld electronic device.
Figure 2:
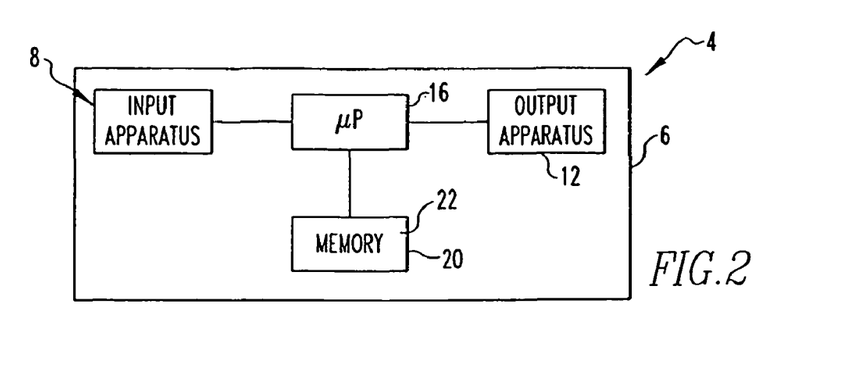
FIG. 2 is a block diagram of the handheld electronic device of FIG. 1.

An improved handheld electronic device 4 is indicated generally in FIG. 1 and is depicted schematically in FIG. 2. The exemplary handheld electronic device 4 includes a housing 6 upon which are disposed a processor unit that includes an input apparatus 8, an output apparatus 12, a processor 16, and a memory 20. The processor 16 may be, for instance, and without limitation, a microprocessor (µP) and is responsive to inputs from the input apparatus 8 and provides output signals to the output apparatus 12. The processor 16 also interfaces with the memory 20. Examples of handheld electronic devices are included in U.S. Pat. Nos. 6,452,588 and 6,489,950, the disclosures of which are incorporated by reference herein.

As can be understood from FIG. 1, the input apparatus 8 includes a keypad 24 and a thumbwheel 32. As will be described in greater detail below, the keypad 24 is in the exemplary form of a reduced QWERTY keyboard including a plurality of keys 28 that serve as input members. It is noted, however, that the keypad 24 may be of other reduced configurations, such as a reduced AZERTY keyboard, a reduced QWERTZ keyboard, or other keyboard arrangement, whether presently known or unknown. In this regard, the expression "reduced" and variations thereof, in the context of a keyboard, such as a keypad or other arrangement of input members, shall refer broadly to an arrangement in which at least one of the input members has assigned thereto a plurality of characters within a given set, such as a plurality of letters, for example, in the set of Latin letters, for example, thereby rendering ambiguous an intended result of an actuation of the at least one of the input members.

In this regard, and as will be set forth below in greater detail, the system architecture of the handheld electronic device 4 advantageously is organized to be operable independent of the specific layout of the keypad 24. Accordingly, the system architecture of the handheld electronic device 4 can be employed in conjunction with virtually any keypad layout substantially without requiring any meaningful change in the system architecture.

The keys 28 are disposed on a front face of the housing 6, and the thumbwheel 32 is disposed at a side of the housing 6. The thumbwheel 32 can serve as another input member and is both rotatable, as is indicated by the arrow 34, to provide input to the processor 16, and also can be pressed in a direction generally toward the housing 6, as is indicated by the arrow 38, to provide another input to the processor 16.

Among the keys 28 of the keypad 24 are a <NEXT> key 40 and an <ENTER> key 44. The <NEXT> key 40 can be pressed to provide a selection input to the processor 16 and provides substantially the same selection input as is provided by a rotational input of the thumbwheel 32. Since the <NEXT> key 40 is provided adjacent a number of the other keys 28 of the keypad 24, the user can provide a selection input to the processor 16 substantially without moving the user's hands away from the keypad 24 during a text entry operation.

As can further be seen in FIG. 1, many of the keys 28 include a number of characters 48 disposed thereon. As employed herein, the expression "a number of" and variations thereof shall refer broadly to any quantity, including a quantity of one. In the exemplary depiction of the keypad 24, many of the keys 28 include two or more characters, such as including a first character 52 and a second character 56 assigned thereto. It is understood that the expression "characters" shall broadly be construed to include letters, digits, symbols and the like and can additionally include ideographic characters, components thereof, other linguistic elements, and the like. The keys 28 having one or more characters 48 or other linguistic elements can be considered to be linguistic input members.

One of the keys 28 of the keypad 24 includes as the characters 48 thereof the letters "Q" and "W", and an adjacent key 28 includes as the characters 48 thereof the letters "E" and "R". It can be seen that the arrangement of the characters 48 on the keys 28 of the keypad 24 is generally of a QWERTY arrangement, albeit with many of the keys 28 including two of the characters 48.

The memory 20, depicted schematically in FIG. 2, can be any of a variety of types of internal and/or external storage media such as, without limitation, RAM, ROM, EPROM(s), EEPROM(s), and the like that provide a storage register for data storage such as in the fashion of an internal storage area of a computer, and can be volatile memory or nonvolatile memory. The memory 20 additionally includes a number of routines depicted generally with the numeral 22 for the processing of data. The routines 22 can be in any of a variety of forms such as, without limitation, software, firmware, and the like. The routines 22 include a software-based text disambiguation function (e.g., "disambiguation software") as described elsewhere herein as an application, as well as other routines.

As described in greater detail herein, FIG. 1 shows an exemplary output 64 being depicted on the display 60 that includes a text component 68 and a variant component 72. The variant component 72 includes a default portion 76 and a variant portion 80. The contents of the default portion 76 are also output as the text component 68. The variant component 72 represents a list of possible intended inputs (in the form of a number of character strings or combinations) as generated by the disambiguation software. A user may select one of the items listed in the variant component 72 (i.e., either the default portion 76 or one of items of the variant portion 80) for inclusion in the final text component 68. Methods of selecting a specific variant component 72 for inclusion in the final text component 68 are discussed in commonly owned U.S. patent application Ser. No. 11/074,571 the disclosure of which is incorporated by reference herein.

In response to the user's input, the disambiguation software generates the variant component 72. The variant component 72 generated is dependent upon the language designated for the disambiguation software. In the current embodiment, the disambiguation software employs data structures containing word objects that are generally organized in data tables according to the first two letters of the word object. For instance, the data table associated with the prefix "CO" would include all of the words such as "CODE", "COIN", "COMMUNICATION", and the like. Depending upon the quantity of word objects within any given data table, the data table may additionally include sub-data tables within which word objects are organized by prefixes that are three characters or more in length.

Each word object is associated with a frequency object. Accordingly, when a prefix object is sought to be used to identify a corresponding word object, and for instance the instant prefix object is "AP", the "AP" data table will be consulted. Since all of the word objects in the "AP" data table will correspond with the prefix object "AP", the word object in the "AP" data table with which is associated a frequency object having a frequency value relatively higher than any of the other frequency objects in the "AP" data table is identified. The identified word object and the associated frequency object are then stored in a result register that serves as a result of the various comparisons of the generated prefix objects with the contents of the memory 20. "Frequency value" as used herein generally refers to a metric that indicates how likely a specific word is to be used according to common usage for a particular language. The frequency value for the specific word may be modified, for example, depending upon the specific usage patterns for that word as learned by the disambiguation software.

In the current embodiment, multiple data structures may be used, for example, to separate word objects according to language. Word objects found in an English language dictionary and their associated frequency objects may be stored in first data structure, words objects found in a French language dictionary and their associated frequency objects may be stored in second data structure; words objects found in a German language dictionary and their associated frequency objects may be stored in another data structure, etc. Accordingly, the data table associated with the prefix "CO" for the English language dictionary data structure may include different word objects than the data table associated with the prefix "CO" for the French language dictionary data structure.

Furthermore, although an identical word object may exist in more that one data structure, the frequency object associated therewith may be different for each data structure. For example, the word object "toast" may exist in both the English and French language dictionary data structures, but the word object "toast" located in the English language dictionary data structure may be associated with a frequency object having a higher frequency value than the word object "toast" located in the French language dictionary data structure.

When a particular language is designated for the disambiguation software, results in that language are preferred over results from other languages. For example if English is designated, the disambiguation software will search for word objects in the data structure containing words found in the English language dictionary before searching for word objects in the data structures containing words found in the French and German dictionaries. Alternatively, the disambiguation software may only search word objects contained within the data structures of the designated language dictionary. Still alternatively, the disambiguation software may search for word objects in all data structures and output the results from the designated language as results that are preferred over results in other languages.

Figure 3:
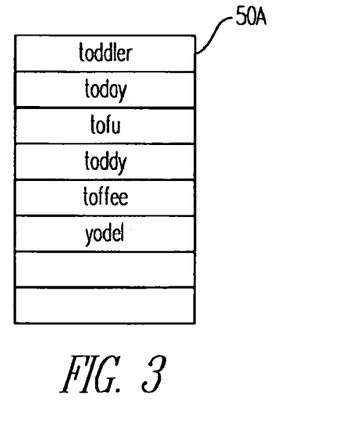
FIG. 3-5 are exemplary contents of result registers produced by a routine executed by the handheld electronic device shown in FIGS. 1 and 2.

FIG. 3, for example, illustrates the contents of a results register 50A that may be provided when the user attempts to type the word "today" with English designated for the disambiguation software. More specifically, when the user depresses the "TY", "OP", and "DF" keys in sequence, the disambiguation software will search for word objects contained in the English language data tables associated with the prefixes "TOD", "TOF", "TPD", "TPF", "YOD", "YOF", "YPD", and "YPF". The word objects that correspond with the prefixes "TOD", "TOF", "TPD", "TPF", "YOD", "YOF", "YPD", and "YPF" and which are associated with frequency objects having a relatively higher frequency values are identified. The identified word objects and the frequency value of their associated frequency objects are then stored in the result register 50A. As illustrated in FIG. 3, for example, the word objects "toddler", "today", "tofu", "toddy" "toffee", and "yodel" may be stored in the result register 50A.

Figure 4:
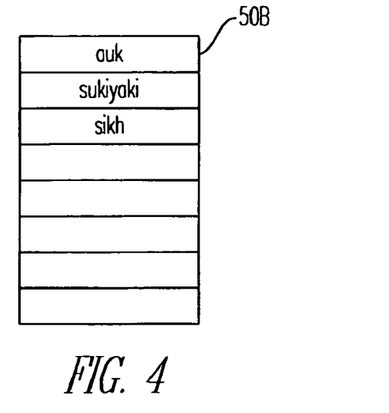

FIG. 4, however, illustrates the contents of a results register 50B that may be provided when the user attempts to type the equivalent word in French (i.e., "aujourd'hui") while English remains designated for the disambiguation software. More specifically, when the user depresses the "AS", "UI", and "JK" keys in sequence, the disambiguation software may search only for word objects contained in the English language data tables associated with the prefixes "AUJ", "AUK", "AIJ", "AIK", "SUJ", "SUK", "SIJ", and "SIK". The word objects that correspond with the prefixes "AUJ", "AUK", "AIJ", "AIK", "SUJ", "SUK", "SIJ", and "SIK" and which are associated with frequency objects having a relatively higher frequency values are identified. The identified word objects and the frequency value of their associated frequency objects are then stored in the result register 50B. As illustrated in FIG. 4, for example, the word objects "auk", "sukiyaki", and "Sikh" may be stored in the result register 50B. As seen in FIG. 4, the word objects stored in result register 50B do not include the desired French word "aujourd'hui".

Figure 5:
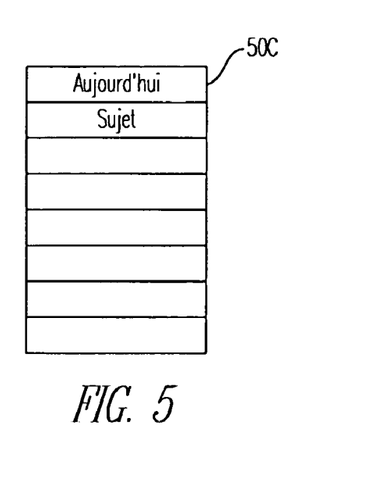

In contrast if French is designated, when the user depresses the "AS", "UI", and "JK" keys in sequence, the disambiguation software will search for word objects contained in the French language data tables associated with the prefixes "AUJ", "AUK", "AIJ", "AIK", "SUJ", "SUK", "SIJ", and "SIK". The word objects that correspond with the prefixes "AUJ", "AUK", "AIJ", "AIK", "SUJ", "SUK", "SIJ", and "SIK", that are stored in the French language data tables, and which are associated with frequency objects having a relatively higher frequency values are identified and stored in the result register 50C as illustrated in FIG. 5. For example, the word objects "aujourd'hui" and "sujet" may be stored in the result register 50C. As seen in FIG. 5, the word objects stored in result register 50C include the desired French word "aujourd'hui".

In one embodiment, handheld electronic device 4 includes a number of routines (for example, routine 120 represented schematically in FIG. 6 and routine 200 represented schematically in FIG. 9) stored in memory 20 and executable by processor 16, for automatically selecting the language preferred by the disambiguation software. Routine 120, for example, may be initiated in response to user input related to drafting a message. The user input may include, for example, entry of an email address for one or more recipients, selecting the "reply" option for a previously received message, and/or selecting the "forward" option for a previously written/received message.

Figure 6:
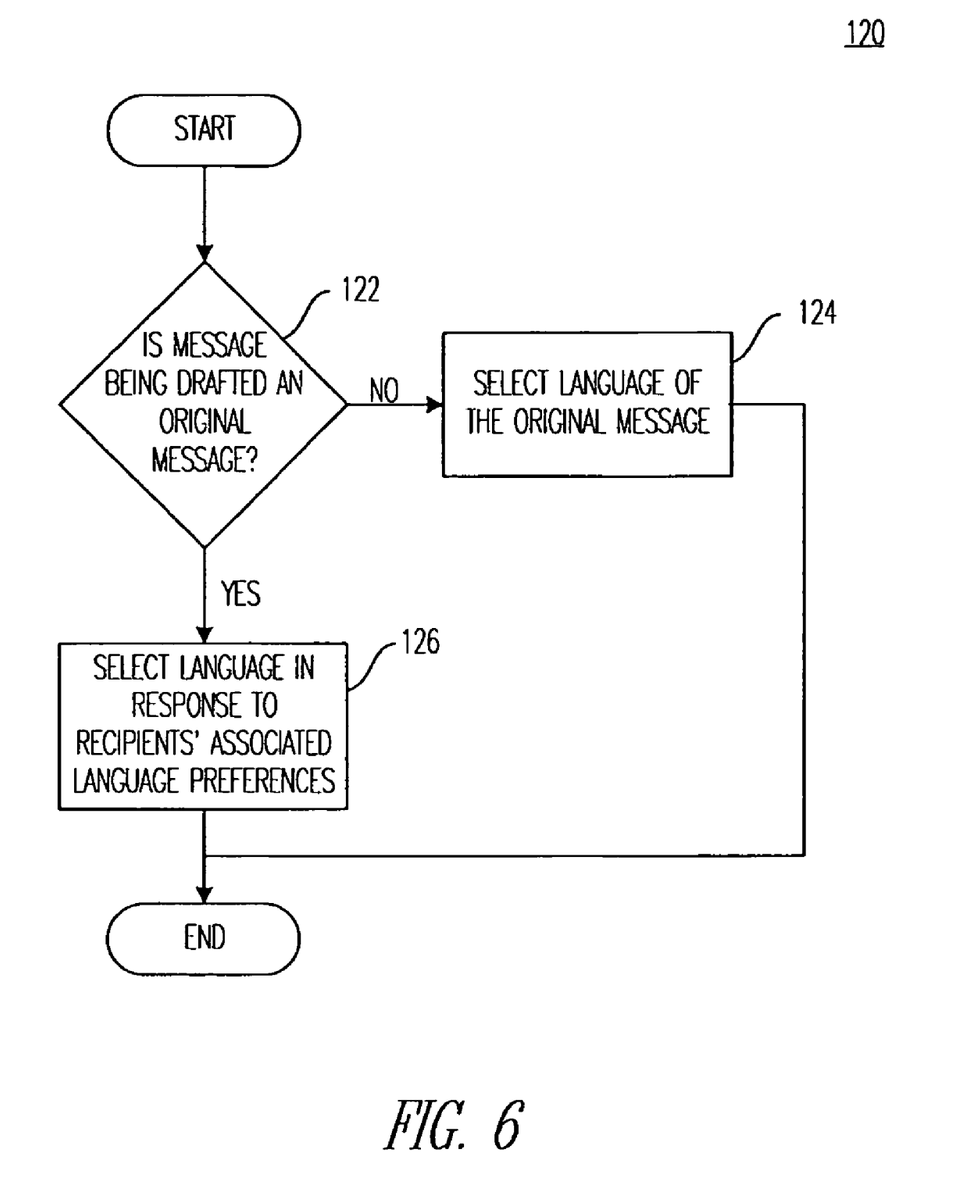
FIG. 6 is a flowchart depicting a routine executed by the processor of the handheld electronic device of FIGS. 1 and 2.

Referring now to FIG. 6, a determination is made at operation 122 as to whether the user input relates to an original message. An "original message" generally refers to a message which does not depend from another message (e.g., the first message in message thread). An "original message" may also refer to a message from which the current message (i.e., the message being drafted) depends. A "derived message" generally refers to a message which depends from a previous message in the message thread (e.g., an original message). For example, the message being drafted by a user may be a reply to another message that was previously received by the user. In this example, the message previously received by the user is an "original message" and the reply message being drafted by the user is a "derived message".

If it is determined in operation 122 that the user input relates to drafting an original message, operational control passes to operation 126 and a language is selected in response to the intended recipients' associated language preferences. In the current embodiment, each recipient may have associated therewith one or more languages via "language tags". It should be noted that any number of language tags may be associated with a user. Preferably, contact information associated with each recipient includes one or more actual fields containing language tags specifying at least the recipient's preferred language (i.e., a "preferred language tag") and secondary language (i.e., a "secondary language tag"). After the language is selected in operation 126, routine 120 is terminated and the disambiguation software utilizes the selected language.

If the user input does not relate to an original message (i.e., if the user input relates to a derived message), operational control is passed to operation 124. In operation 124, the language of the original message (e.g., the message from which the current reply message is derived) is determined and the language of the original message is selected for use by the disambiguation software. In the current embodiment, the language of the original message may be determined, for example, by examining the preferred language tag associated with the user who sent the original message, by examining certain encoding (e.g., ASCII, Latin, UTF-8, etc.) associated with the original message, and/or by actual detection of the language in the body of the original message, among others. The actual language in the body of the message may be determined, for example and without limitation, by 1) examining the message for a specific encoding type that is unique to a particular language or subset of languages, 2) examining the message for special characters or encoded values that are unique to a particular language or subset of languages, 3) examining dictionary patterns matching a particular language or subset of languages, and 4) examining special tags or other information in the header of the original message. After the language is selected in operation 124, routine 120 is terminated and the disambiguation software utilizes the selected language. Although not shown in FIG. 6, it should be noted that an override may also be provided so that a user can manually select the language for the text disambiguation software.

Figure 7:
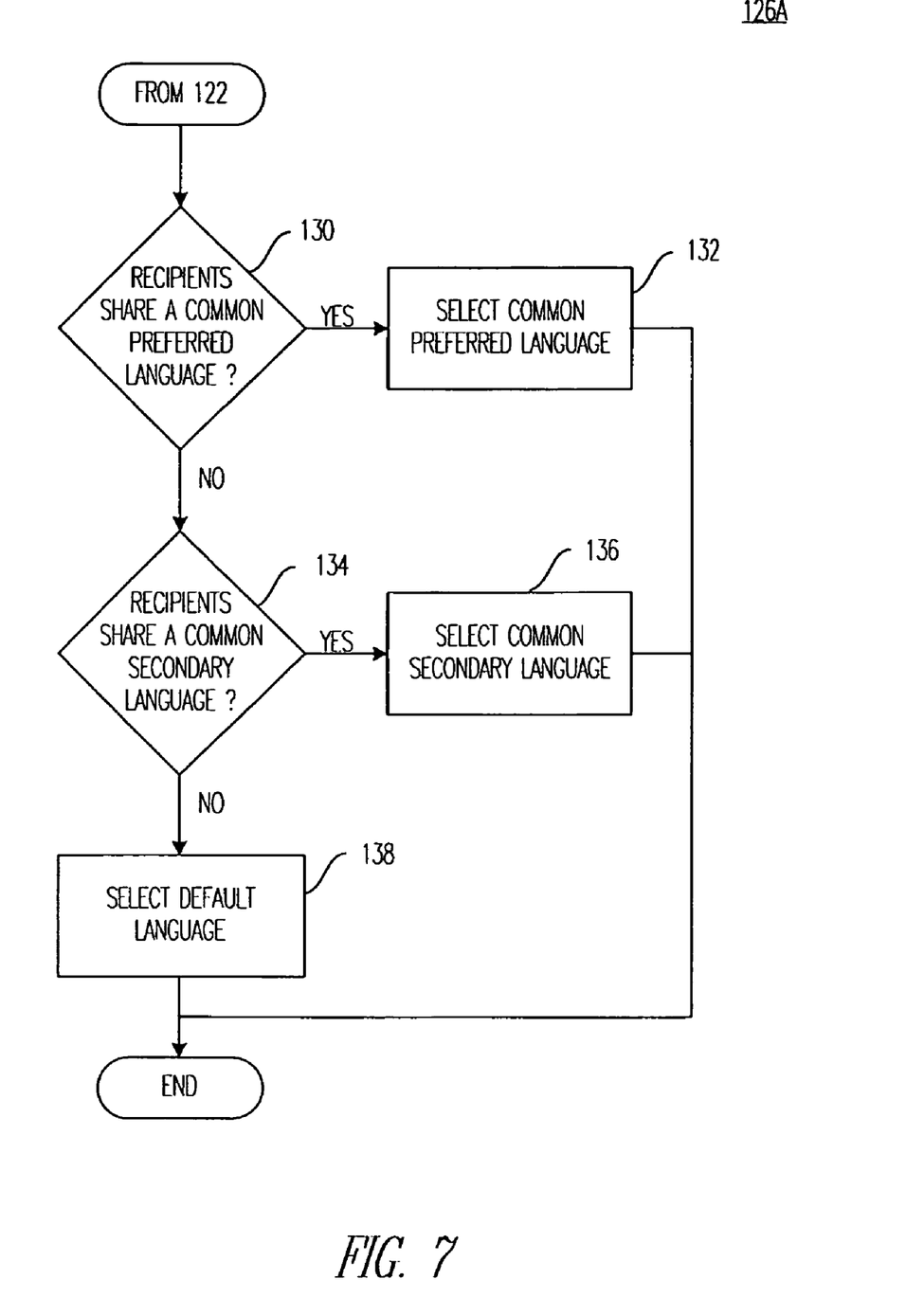
FIG. 7 is a flowchart illustrating a more detailed schematic of a portion of the routine depicted in FIG. 6 according to one embodiment.

FIG. 7 employs the numeral 126A to illustrate, according to one embodiment, a detailed schematic representation of operation 126 of FIG. 6. Operational control is passed to operation 126A from operation 122. A determination is then made at operation 130 (FIG. 7) as to whether the recipients share a common preferred language. For example, in the current embodiment, the preferred language tag of each intended recipient is examined and, if a predetermined percentage of the intended recipients share a common preferred language (e.g., 100%), operational control passes to operation 132 where that common preferred language is selected for use by the disambiguation software. Routine 120 is then terminated and the disambiguation software utilizes the selected common preferred language. If the predetermined threshold is not met or exceeded (e.g., if the percentage of recipients do not share a common preferred language), operational control passes to operation 134.

If control passed to operation 134 (i.e., if the predetermined threshold for the common preferred language is not met or exceeded), a determination is made at operation 134 as to whether the recipients share a common secondary language. For example, in the current embodiment, the secondary language tag of each intended recipient is examined, and if all (i.e., 100%) of the intended recipients share a common secondary language, operational control passes to operation 136 where that common secondary language is selected for use by the disambiguation software. Routine 120 is then terminated and the disambiguation software utilizes the selected common secondary language.

If the predetermined threshold is not met or exceeded (e.g., if the percentage of recipients do not share a common secondary language), operational control passes to operation 138. In operation 138, a default language is selected for use by the disambiguation software. Thereafter, routine 120 is terminated and the disambiguation software utilizes the default language.

It should be apparent to one skilled in the art that the thresholds and measurements may be altered and/or based on criteria other than a percentage while remaining within the scope of the present invention. For example, in the embodiment discussed above, all of the intended recipients must share a common preferred language for operational control to pass to operation 132, and/or all of the intended recipients must share a common secondary language for operational control to pass to operation 136. However, it is also contemplated that operational control may pass to operation 132 or to operation 136 in cases in which less than all the intended recipients share a common preferred language or common secondary language. Operational control may pass to operation 132 or to operation 136, for instance, when eighty-five (85) percent of the intended recipients share a common preferred language or a common secondary language.

It should further be apparent to one skilled in the art that the particular steps discussed above to select a language in response to the recipients' associated language preferences may be altered while remaining the scope of the present invention. For example, assume that the threshold levels for selecting the preferred and secondary languages are each set at seventy-five (75) percent. Further assume that eighty (80) percent of the intended recipients preferred language tags specify the same preferred language, while ninety (90) percent of the intended recipients secondary language tags specify the same secondary language. It will be appreciated by those skilled in the art that simple modifications may be made to the above-discussed embodiment such that in the current example the secondary language, having a greater match percentage, is selected over the preferred language which has a lower match percentage.

As a further example, assume that a user is sending a message to five recipients, each of whom have the primary and secondary language tags as illustrated in Table 1 assigned thereto.

TABLE 1

Recipient Language tags

|  | Primary Language | Secondary Language |
| --- | --- | --- |
| Recipient 1 | English | French |
| Recipient 2 | English | Spanish |
| Recipient 3 | English | Spanish |
| Recipient 4 | Spanish | French |
| Recipient 5 | Spanish | Russian |

It will be appreciated by those skilled in the art that simple modifications may be made to the above-discussed embodiment such that in the current example, Spanish, which is common to four of the five intended recipients (as either a primary or a secondary preferred language) is selected over English (common to three of the five), French (common to two of the five), and Russian (common to one of the five).

Figure 8:
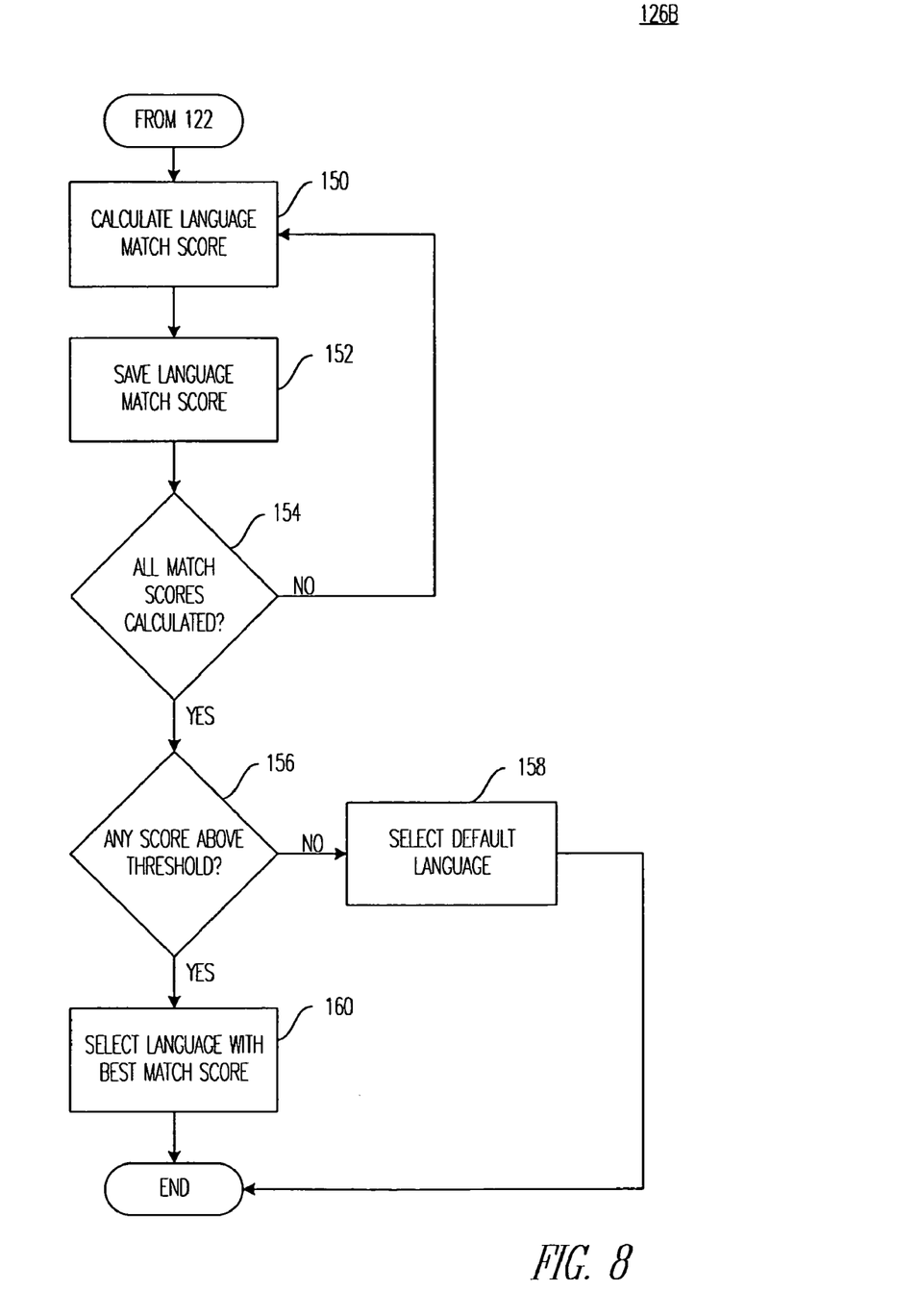
FIG. 8 is a flowchart, similar to FIG. 7, but depicting a portion of the routine depicted in FIG. 6 according to another embodiment.

FIG. 8 employs the numeral 126B to illustrate, according to another embodiment, a detailed schematic representation of an alternative operation 126 from FIG. 6. Operational control is passed to operation 126B from operation 122. A language match score is then calculated at operation 150 for a language that is designated within any one or more the recipients' language tags. For example, assume that a user is sending an original message to five recipients, each of which have the language tags as illustrated in Table 2 assigned thereto.

TABLE 2

Recipient Language tags

|  | Primary Language (+1) | Secondary Language (+2) | Third Language (+3) | Fourth Language (+4) |
| --- | --- | --- | --- | --- |
| Recipient 1 | English | French |  |  |
| Recipient 2 | German | English | French | Spanish |
| Recipient 3 | French | Spanish |  |  |
| Recipient 4 | Spanish | German | English | French |
| Recipient 5 | English | German | Spanish |  |

In the current example, a match score is calculated for a first language (e.g., English). English is the primary language for recipients 1 and 5 (+1 point each), the secondary language for recipient 2 (+2 points), and the third language for recipient 4 (+3 points). English is not specified for recipient 3, therefore under the current embodiment, the maximum number of points is assigned (+4 points). Thus, the match score for English totals 11 (i.e., 1+1+2+3+4). Operational control then passes to operation 152 in which the match score for English is saved.

A determination is then made at operation 154 as to whether a match score has been calculated for each language designated within any one or more the recipients' language tags. In the instant example, match scores have not yet been calculated for German, French, and Spanish. Thus, operational control branches back to operation 150.

The match score is then calculated for the next language (e.g., German). As illustrated in Table 2, German is the primary language for recipient 2 (+1 point), the secondary language for recipients 4 and 5 (+2 points each), and is not specified for recipients 1 and 3 (+4 points each). Thus, the match score for German totals 13, which is saved in operation 152. Likewise, the match scores for French (14) and Spanish (14) are calculated and saved. After a match score is calculated for each language designated within any one or more the recipients' language tags, operational control branches from operation 154 to operation 156.

In operation 156, a determination is made as to whether any of the calculated match scores is equal to or less than a threshold value. For example, assume in the current embodiment that a threshold is set at 13. Both English (11) and German (13) have match scores that satisfy this threshold. Accordingly, operational control branches "YES" and the language with best match score is selected in operation 160. In the current example, the language having the lowest match score total represents the best match. Thus, English is selected in operation 160. Now assume instead that the threshold is set at 10, none of the languages have match scores that satisfy this threshold. Accordingly at operation 156, control would branch "NO" and a default language would be selected at operation 158.

It should be apparent to one skilled in the art that the number of language tags assigned, the particular point value assigned to each language tag, and the manner in determining which language has the best match score (e.g., the language with the lowest match score) are exemplary and may be altered while remaining within the scope of the present invention. Additionally, the particular steps discussed above to select a language in response to the recipients' associated language preferences are exemplary and are in no way intended to limit the scope of the present invention. Accordingly, other methods of selecting a language in response to the recipients' associated language preferences may be used while remaining within the scope of the present invention.

The invention can define any language ranking or scoring function using, for example and without limitation, 1) the recipients, their language preferences, and the languages of their prior sent/received messages, 2) the actual keys pressed, together with language dictionaries and associated word frequencies, 3) the language preferences and weightings of the user, 4) the word frequencies of the specific user (i.e. learning dictionary), 5) user input and override to the language selection process, 5) other configuration and control parameters, both constant and user adjustable.

Figure 9:
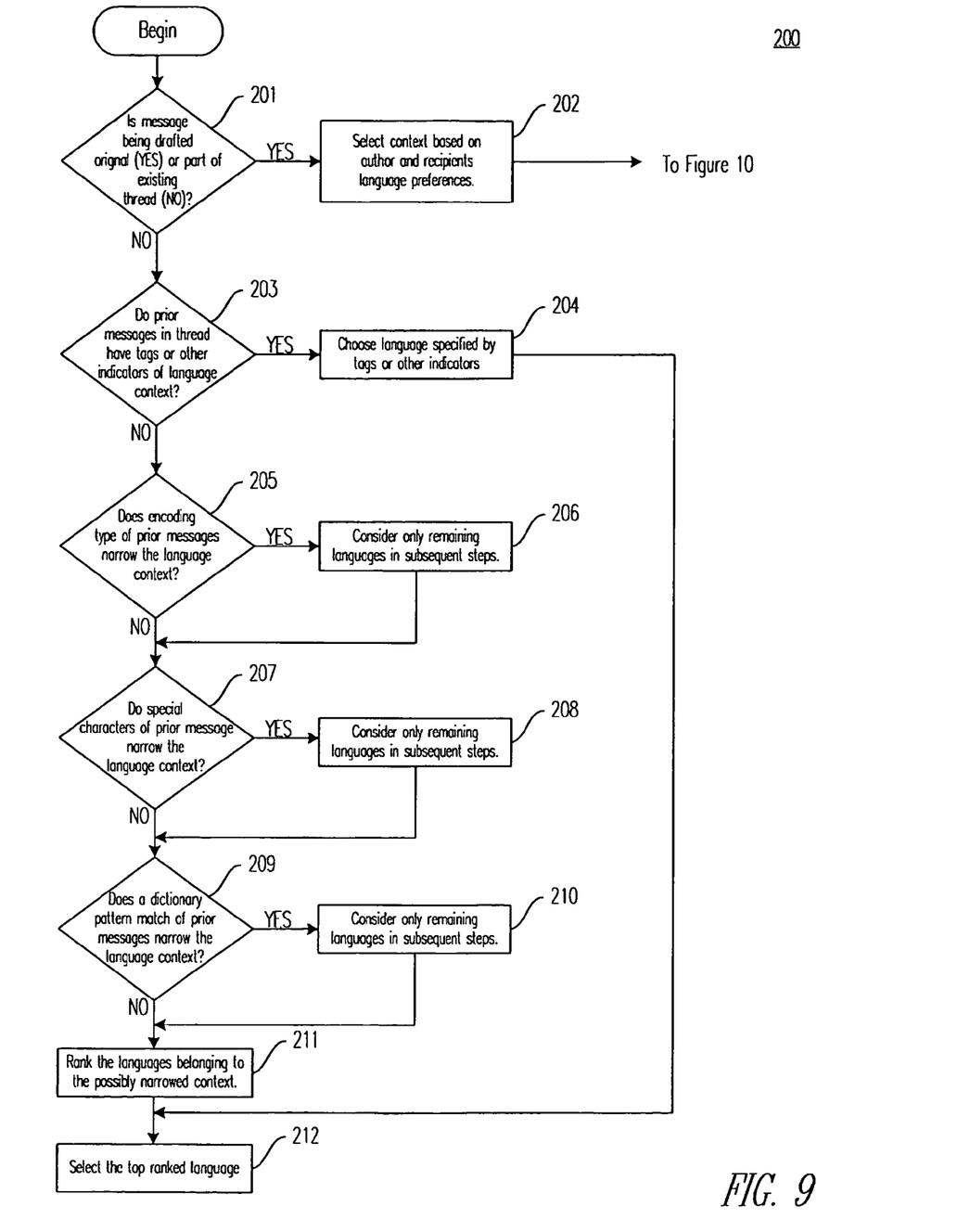
FIGS. 9 and 10 are flowcharts depicting a routine executed by the processor of the handheld electronic device of FIGS. 1 and 2.

The handheld electronic device 4 may also execute a routine 22 for determining the context of a text entry session and for selecting, in response to the determined context, the language to be utilized by the disambiguation software during that session. More specifically, FIGS. 9 and 10 are flowcharts depicting a routine 200 for determining the context of a message being composed during a text entry session and for selecting the language to be utilized by the disambiguation software during that text entry session.

As used herein, a "text entry session" broadly refers to a period of time in which a user enters input (such as text) into, and otherwise interfaces with, an application in order to complete a discrete operation within that application. For example, the composition of a message (e.g., email, SMS, instant message, meeting invitation, etc.) may be referred to as a "text entry session". A text entry session may also include, for example and without limitation, composing a document (e.g., memo, task, article, etc.), interacting with a text based user interface (e.g., web form, graphical user interface dialog box, user prompt, etc.), and entering free-from text.

In the current embodiment, routine 200 is initiated when the user begins to compose a message (e.g., email, SMS, instant message, meeting invitation, etc.) on the handheld device 4. A determination is made at operation 201 as to whether the message being drafted is an original message or part of an existing thread. If an original message, operational control branches "YES" and the context of the message is selected in operation 202. The context is based, for example, on the language preferences of the author (i.e., the message composer) and/or the language preferences of the recipients.

Figure 10:
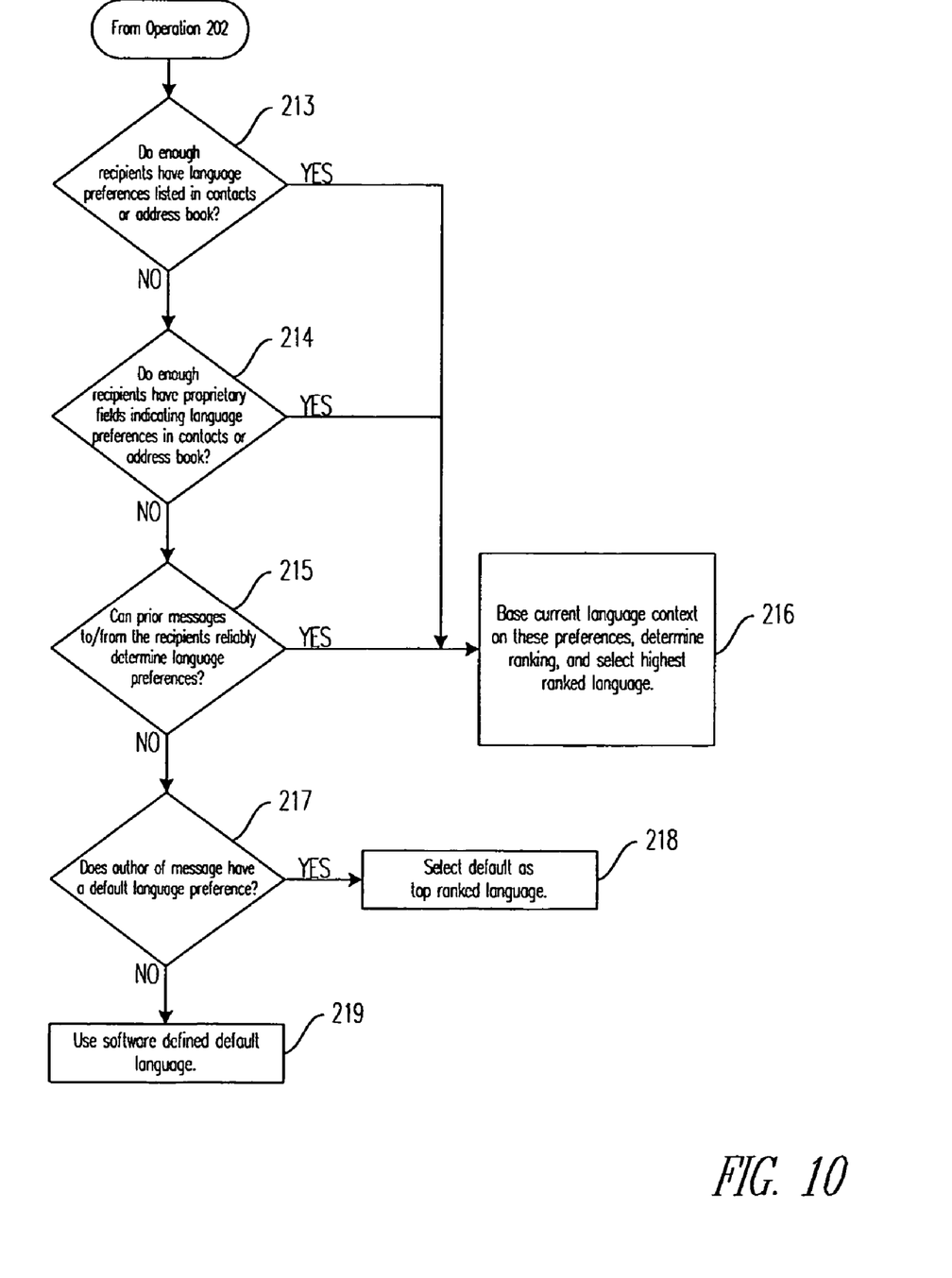

Once the context of the message is selected, operation 200 continues (as seen in FIG. 10) such that the language(s) used by the disambiguation software during the text entry session is/are selected. More specifically, operational control passes to operation 213. A determination is made in operation 213 as to whether enough of the message's recipients have language preferences listed in their associated contacts and/or address book. If so, operational control branches "YES" and is passed to operation 216 where the current language context (as selected in operation 202) and the language preferences listed in the contacts and/or address book of the recipients are used to rank the languages available for use by the disambiguation software during the text entry session. In the current embodiment, the top ranked language is automatically selected for use by the disambiguation software.

Figure 11:
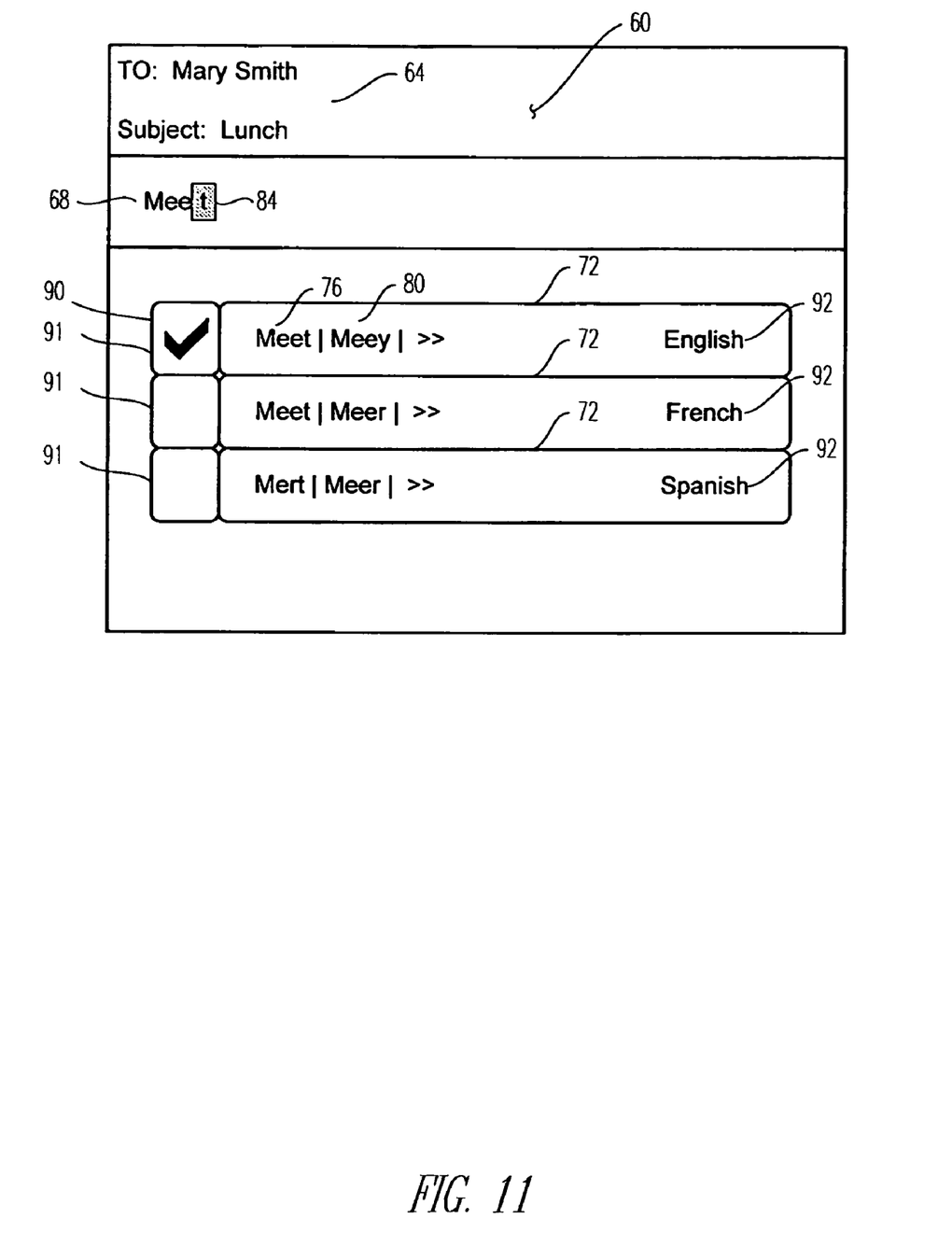
FIG. 11 is an exemplary display of the handheld device of FIG. 1.

The selected languages may be displayed, for example, as shown in FIG. 11. FIG. 11 shows an exemplary output 64 depicted on the display 60. The output 64 includes a text component 68 and a number of variant components 72. A variant component 72 associated with each language determined to be available for use by the disambiguation software during the text entry session is displayed. Each variant component 72 includes a default portion 76 and a variant portion 80 for its related language. The variant components 72 may be arranged such that the highest ranked language (here, English) is displayed first. Each variant component 72 includes an identifier label 92 (e.g., "English"; "French"; "Spanish") and a selection box 91. An indicator 90 notifies the user which language is currently selected for use by the disambiguation software. As seen in FIG. 11, the default portion for the selected language (i.e., English) is displayed in the text component 68.

As discussed above, the top ranked language is automatically selected for use by the disambiguation software in the current embodiment. Another language, however, may be selected while remaining within the scope of the present invention. For instance, an override may be provided so that a user can scroll to another language (e.g., French or Spanish in FIG. 11) and manually select another language to be used by the disambiguation software. The manually selected language may be used by the disambiguation software for the current word being typed (i.e., and then revert back to the highest ranked language for the remainder of the text entry session) or may be used for the remainder of the text entry session.

Returning to operation 213, if not enough of the message's recipients have language preferences listed in their associated contacts and/or address book, operational control branches "NO" and a determination is made at operation 214 as to whether enough recipients have proprietary fields indicating their language preferences in the contacts or address book. If so, operational control branches "YES" and operational control is passed to operation 216 where the current language context (as selected in operation 202) and the language preferences listed in the contacts and/or address book of the recipients are used to rank the languages available for use by the disambiguation software during the text entry session.

If not enough recipients have proprietary fields indicating their language preferences in the contacts or address book, operational control branches "NO" and a determination is made at operation 215 as to whether prior messages to/from the recipients can be used to reliably determine the language preferences. If so, operational control branches "YES" and operational control is passed to operation 216 where the current language context (as selected in operation 202) and the language preferences listed in the contacts and/or address book of the recipients are used to rank the languages available for use by the disambiguation software during the text entry session.

If prior messages to/from the recipients can not be used to reliably determine the language preferences, operational control branches "NO" and a determination is made at operation 217 as to whether the author (i.e., message composer) has a default language preference. If so, operational control branches "YES" and operational control is passed to operation 218 where the language indicated by the default language preference is selected as the top ranked language for use by the disambiguation software. If the author (i.e., message composer) does not have a default language preference, operational control passes to operation 219 and a software defined default language is selected.

Returning to FIG. 9, if it is determined at operation 201 that the message being drafted is not an original message (e.g., the message is part of an existing thread), operational control branches "NO" and the context of the message is based upon the prior messages. A determination is made in operation 203 whether prior messages in the thread have tags or other indicators of the language context. If so, operational control branches "YES" and, in operation 204, the language specified by the tags or other indicators is selected to be used by the text disambiguation software. If not, operational control passes to operation 205.

In operation 205, a determination is made whether the encoding type of the prior messages in the thread narrows the language context. If so, operational control branches "YES" and, in operation 206, those languages that are not suggested by the encoding type are removed from further consideration. Operational control is then passed to operation 207. If the determination in operation 205 is that the encoding type of the prior messages in the thread does not narrow the language context, operational control branches "NO" and is passed to operation 207 (i.e., operation 206 is skipped).

In operation 207, a determination is made whether special characters (e.g., characters specific to a certain language) within the prior messages in the thread narrow the language context. If so, operational control branches "YES" and, in operation 208, those languages that are not suggested by the special characters are removed from further consideration. Operational control is then passed to operation 209. If the determination in operation 207 is that special characters of the prior messages in the thread do not narrow the language context (or if there are no special characters in the prior messages), operational control branches "NO" and is passed to operation 209 (i.e., operation 208 is skipped).

In operation 209, a determination is made whether a dictionary pattern match of prior messages in the thread narrows the language context. If so, operational control branches "YES" and, in operation 210, those languages that are not suggested by the dictionary pattern match are removed from further consideration. Operational control is then passed to operation 211. If the determination in operation 209 is that a dictionary pattern match of the prior messages in the thread does not narrow the language context (or if a dictionary pattern match does not exist in the prior messages), operational control branches "NO" and is passed to operation 211 (i.e., operation 210 is skipped).

In operation 211, the remaining languages (i.e., those not removed by narrowing steps 206, 208, and 210) are ranked. Operational control then passes to operation 212 in which the highest ranked language from operation 211 is selected for use by the text disambiguation software during the text entry session.

It should be apparent that operational process 200 is exemplary and may be altered while remaining within the scope of the present invention. For example, operations may be included such that the language ranking (and thus the selected language) may change within a single session. More specifically, a bi-lingual user may use both English and French words within a single message (i.e., within a single text entry session). Operation 200 may be altered accordingly so the language used by the disambiguation software is selected, for example, on a word-by-word basis.

As another example, operations may be added to operational process 200 for updating the recipients' preferences and/or the composer's preferences in response to the selected language. The operations may include updating the preferences such that weighting associated with each of at least some of the preferences of the composer are adjusted. As a further example, a manual override function may be added such that the manually selected language is used by the text disambiguation software during the text entry session.

Additionally, it should be apparent that other operational processes may determine the context and select a language for different types of a text entry sessions, for example as discussed above (and without limitation), composing a document (e.g., memo, task, article, etc.), interacting with a text based user interface (e.g., web form, graphical user interface dialog box, user prompt, etc.), and entering free-from text.

For example, the handheld electronic device 4 may also execute a routine 22 for determining the context during composition of a document and for selecting, in response to the determined context, the language to be utilized by the disambiguation software during that text entry session. Determining the context may include gathering information associated with the document composition. The information may relate to the preferences of the document composer, an application in which the document is being composed, and a subject of the document, among others.

As another example, the handheld electronic device 4 may also execute a routine 22 for determining the context during an interaction between a user and a user interface executed by the electronic device and for selecting, in response to the determined context, the language to be utilized by the disambiguation software during that text entry session. Determining the context for the text entry session may include gathering information associated with the interaction between the user and the user interface. The information may relate to an application in which the user interface is employed and a purpose for which the user interface is being employed, among others.

As another example, the handheld electronic device 4 may also execute a routine 22 for determining the context during a free-form text entry session executed by the electronic device and for selecting, in response to the determined context, the language to be utilized by the disambiguation software during that text entry session. Determining the context include gathering information associated with free-form text entry session. The information may relate to the context for a number of past text entry sessions, word correlations within the current free-form text entry session, and grammar correlations within the current free-form text entry session, among others.

While specific embodiments of the invention have been described in detail, it will be appreciated by those skilled in the art that various modifications and alternatives to those details could be developed in light of the overall teachings of the disclosure. For example, although not shown in FIGS. 3 and 4, it will be appreciated by those skilled in the art that an override may be provided so that the user can manually specify the language utilized by the disambiguation software. As a further example, a bias may be implemented such that a language is selected in accordance with user preferences. Accordingly, the particular arrangements disclosed are meant to be illustrative only and not limiting as to the scope of the invention which is to be given the full breadth of the claims appended and any and all equivalents thereof.

What is claimed is:

1. A method for selecting a language from a number of languages used by a text disambiguation function executed by an electronic device during a text entry session, the method comprising:
   determining a context for said text entry session, said determining a context comprising:
      determining that said text entry session is associated with composing a message to a plurality of recipients;
      determining that said message is an original message; and
      examining at least one of a number of language tags associated with each of the plurality of recipients; and
   responsive to said determining a context, selecting automatically one of said number of languages used by said text disambiguation function during said text entry session based on the examined language tags, wherein the selection comprises:
      calculating a match score for each of said number of languages from said number of language tags associated with each of the plurality of recipients;
      comparing one or more of said match scores to a predetermined threshold value;
      selecting one of said number of languages when said one of said number of languages has a match score which satisfies said predetermined threshold; and
      selecting a default language if none of said number of languages has a match score which satisfies said predetermined threshold.

2. The method of claim 1 further comprising outputting an indication of said at least one of said number of languages selected.

3. The method according to claim 1 further comprising updating at least one of a number of language tags associated with a composer of said message and a number of language tags associated with each of the plurality of recipients in response to said selecting.

4. The method according to claim 1, wherein said selecting one of said number of languages includes choosing a default language when a composer of said message has a preference for said default language.

5. A handheld electronic device comprising:
   a reduced keyboard having a plurality of keys;
   a processor; and a memory storing a first language tag identifying a primary language and a second language tag identifying a secondary language for at least two message recipients, and a plurality of routines executable by said processor, wherein a first one or more of said routines implements a keystroke interpretation system having a text disambiguation function, and wherein a second one or more of said routines is adapted to:
  determine a text entry session is associated with composing a message to the at least two recipients;
  examine at least the first language tag and the second language tag for the at least two recipients; and
  select, automatically, for use by said text disambiguation function during said text entry session, the language common to the greatest number of recipients based on the primary and secondary languages of the at least two recipients.

6. A handheld electronic device comprising:
a reduced keyboard having a plurality of keys;
a processor; and
a memory storing a first language tag identifying a primary language and a second language tag identifying a secondary language for at least two message recipients, and a plurality of routines executable by said processor, wherein a first one or more of said routines implements a keystroke interpretation system having a text disambiguation function, and wherein the second of said a second one or more of said routines is adapted to:
  determine a text entry session is associated with composing a message to the at least two recipients;
  examine at least the first language tag and the second language tag associated with each of the at least two recipients; and
  select, automatically, as a language used by said text disambiguation function during said text entry session the primary language of the at least two recipients when a predetermined percentage of the at least two recipients share a common primary language, or when a predetermined threshold of the at least two recipients who share a common primary language is met or exceeded; and
  if the predetermined percentage of the at least two recipients do not share a common primary language and the predetermined threshold of the at least two recipients who share a common primary language is not met or exceeded, select, automatically, as the language used by said text disambiguation function during said text entry session, the secondary language when a predetermined percentage of the at least two recipients share a secondary language, or when a predetermined threshold of the at least two recipients who share a secondary language is met or exceeded.

7. A handheld electronic device comprising:
a reduced keyboard having a plurality of keys;
a processor; and
a memory storing a first language tag identifying a primary language and a second language tag identifying a secondary language for at least two message recipients, and a plurality of routines executable by said processor, wherein a first one or more of said routines implements a keystroke interpretation system having a text disambiguation function, and wherein a second one or more of said routines is adapted to:
  determine a text entry session is associated with composing a message to the at least two recipients;
  examine at least the first language tag and the second language tag associated with the at least two recipients; and
select, automatically, a language used by said text disambiguation function during said text entry session from the primary and secondary languages of the at least two recipients, the language selected having the greatest percentage of recipients sharing that language.

* * * * *